United States Patent
Skalny et al.

(10) Patent No.: US 12,002,973 B2
(45) Date of Patent: Jun. 4, 2024

(54) SURROGATE COMPONENT

(71) Applicant: Government of the United States, as represented by the Secretary of the Army, Washington, DC (US)

(72) Inventors: David Anthony Skalny, Shelby Township, MI (US); Craig William Schmehl, Royal Oak, MI (US)

(73) Assignee: GOVERNMENT OF THE UNITED STATES, AS REPRESENTED BY THE SECRETARY OF THE ARMY, Washington, DC (US)

( * ) Notice: Subject to any disclaimer, the term of this patent is extended or adjusted under 35 U.S.C. 154(b) by 621 days.

(21) Appl. No.: 17/109,432

(22) Filed: Dec. 2, 2020

(65) Prior Publication Data

US 2022/0173366 A1 Jun. 2, 2022

(51) Int. Cl.
| | |
|---|---|
| H01M 50/172 | (2021.01) |
| H01M 10/42 | (2006.01) |
| H01M 50/20 | (2021.01) |
| H01R 13/00 | (2006.01) |

(52) U.S. Cl.
CPC ....... *H01M 50/172* (2021.01); *H01M 10/425* (2013.01); *H01M 50/20* (2021.01); *H01M 2220/20* (2013.01); *H01R 13/00* (2013.01)

(58) Field of Classification Search
CPC .................................................. H01M 50/172
USPC .......... 324/76.11, 538, 756.03; 439/169, 219
See application file for complete search history.

(56) References Cited

U.S. PATENT DOCUMENTS

| | | | |
|---|---|---|---|
| 6,624,532 B1* | 9/2003 | Davidow .......... | H02J 13/00034 307/31 |
| 6,869,306 B1* | 3/2005 | Sung .................... | H01R 13/506 439/449 |
| 6,873,167 B2 | 3/2005 | Goto et al. | |
| 8,691,416 B1* | 4/2014 | Carroll ................ | H01M 50/204 429/100 |
| 2006/0008213 A1* | 1/2006 | Lord .................... | G02B 6/4281 385/94 |
| 2013/0244075 A1* | 9/2013 | Lentine, Jr. ......... | H01M 50/204 429/100 |
| 2015/0253160 A1* | 9/2015 | Murphy ............... | H05K 7/1461 73/431 |
| 2015/0378122 A1* | 12/2015 | Simmons ............. | G02B 6/4471 439/529 |

OTHER PUBLICATIONS

Aibocn Inc.; EBL-Battery-Converter-Adapter-Separator/dp/B075CJT65G; Retrieved from https://www.amazon.com; Sep. 10, 2020.

(Continued)

*Primary Examiner* — Vincent Q Nguyen
(74) *Attorney, Agent, or Firm* — Daniel E. Hegner; Christopher H. Bond

(57) ABSTRACT

A surrogate component for a test system is described that includes a body having a first shell, a second shell coupled to the first shell, and a wiring harness. The first shell includes a plurality of exit holes and the second shell includes a first connection interface and a second connection interface. The wiring harness passes through at least one of the plurality of exit holes of the first shell and includes at least one data communication line coupled to the first connection interface and at least one power line coupled to the second connection interface.

13 Claims, 6 Drawing Sheets

(56) References Cited

OTHER PUBLICATIONS

Lenink.; Lenink-Battery-Eliminator-Supply-Replace/dp/B07ZGF6BMM; Retrieved from https://www.amazon.com; Sep. 10, 2020.
Yuyao Hengxing Pipe Industry Co., Ltd.; 4-Inch-round-waterproof-electrical-box-with-5-outlet-holes-aluminum-die-cast-material.; Retrieved from: https://www.electrical-conduitfittings.com; Sep. 10, 2020.
Pomona Electronics .; Shielded Box, Size J (4.25" ×1.50" ×1.06") Blue Enamel, With Cover.; Retrieved from: https://www.pomonaelectronics.com; Sep. 10, 2020.
PowEver.; EP-5A Plus EH-5 EH-5A Ac Power Charger Kit Camera Adapter for Nikon Coolpix.; Retrieved from: https://www.amazon.com; Sep. 10, 2020.
Raeisusp; Mobile Power Bank Charger USB Cable; Retrieved from: https://www.amazon.com; Dec. 2, 2020.
Lenink.; Lenink AA Battery Power Supply Adapter, Replace 4 AA Battery,White.; Retrieved from: https://www.amazon.com; Sep. 10, 2020.
SupplyNet.; Radio Cables & Connectors for Military Applications.; Retrieved from: https://www.tacticaleng.com; Sep. 10, 2020.
Circuit Globe.; Ammeter Shunt; https://circuitglobe.com/ammeter-shunt.html; Sep. 10, 2020.

\* cited by examiner

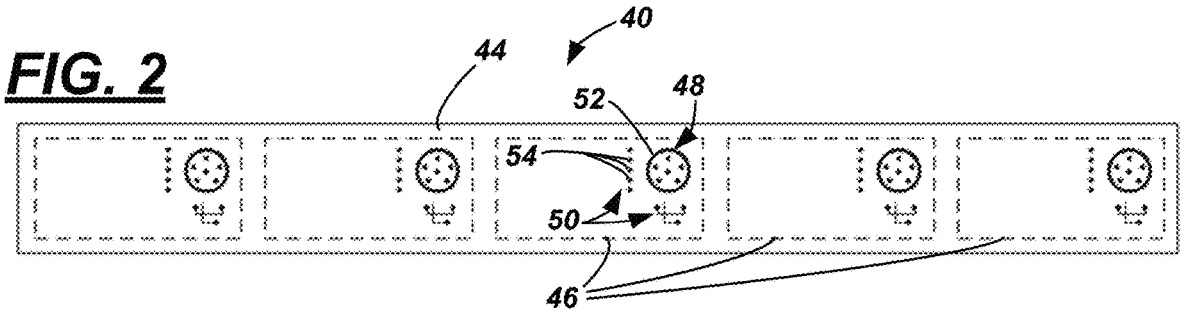
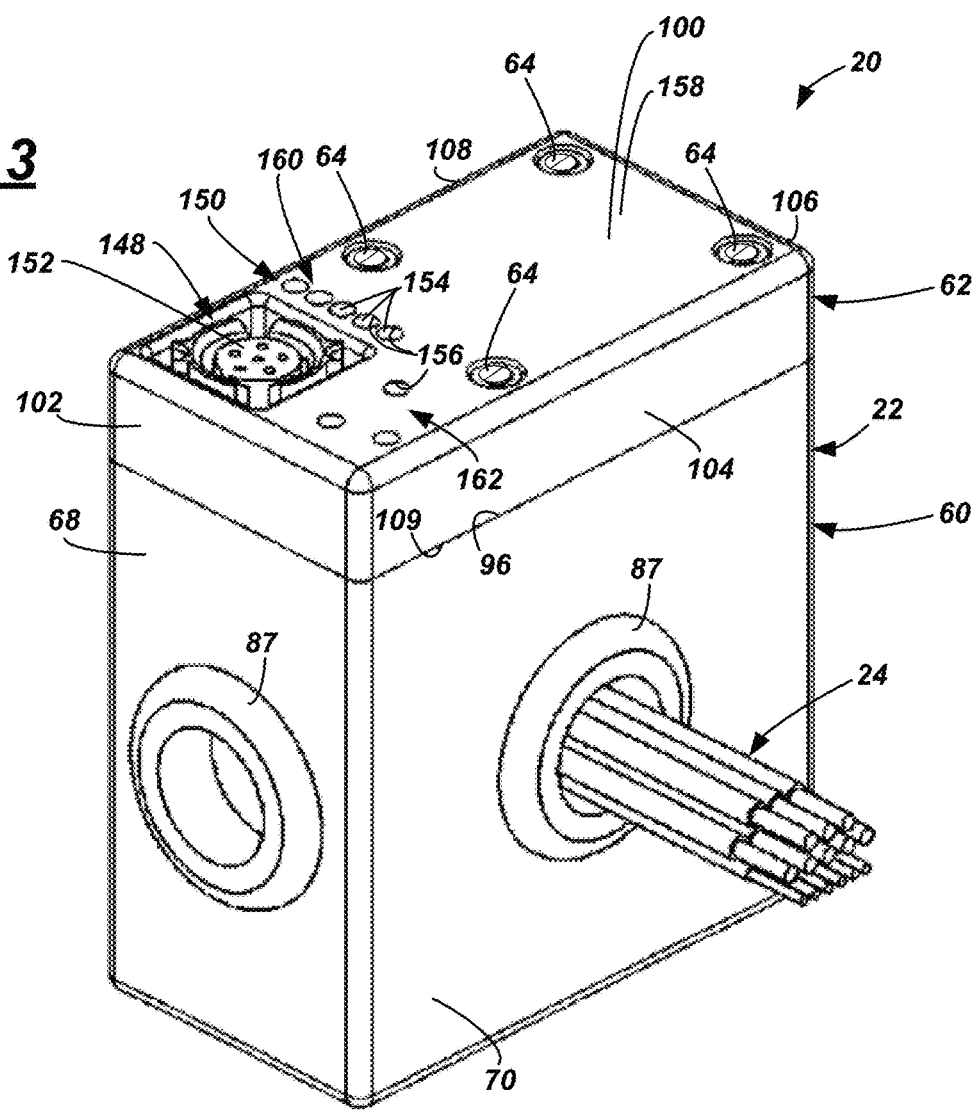

SURROGATE COMPONENT

GOVERNMENT INTEREST

The invention(s) described herein may be manufactured, used, and/or licensed by or for the Government of the United States of America without payment by the Government of any royalties thereon.

TECHNICAL FIELD

The present disclosure pertains to an electrical test fixture.

BACKGROUND

Pre-production testing of electrically-powered equipment, among other types of testing, may include subjecting the equipment to environmental conditions (including shock and vibration profiles) that may cause electrical testing wires/sensors to become dislodged from the equipment under test. Disconnected testing wires/sensors result in a loss of data collection (and typically require undesirable repetition of the test sequence). The complexity of maintaining electrical contact increases when the equipment has mobile capability and is testing comprises the equipment operating in a moving mode (e.g., such as mobile vehicle testing).

SUMMARY

According to one non-limiting embodiment of the disclosure, a surrogate component for a test system is described. The surrogate component may comprise: a body, comprising, a first shell comprising a plurality of exit holes; and a second shell coupled to the first shell, wherein the second shell comprises a first connection interface and a second connection interface; and a wiring harness, comprising: at least one data communication line coupled to the first connection interface and passing through one of the plurality of exit holes; and at least one power line coupled to the second connection interface and passing through the one of the plurality of exit holes.

BRIEF DESCRIPTION OF THE DRAWINGS

FIG. 2 is a schematic diagram illustrating a portion of a battery compartment of the electronic device shown in FIG. 1.

FIG. 3 is a perspective view of an embodiment of the surrogate component.

DETAILED DESCRIPTION

Figure 1:
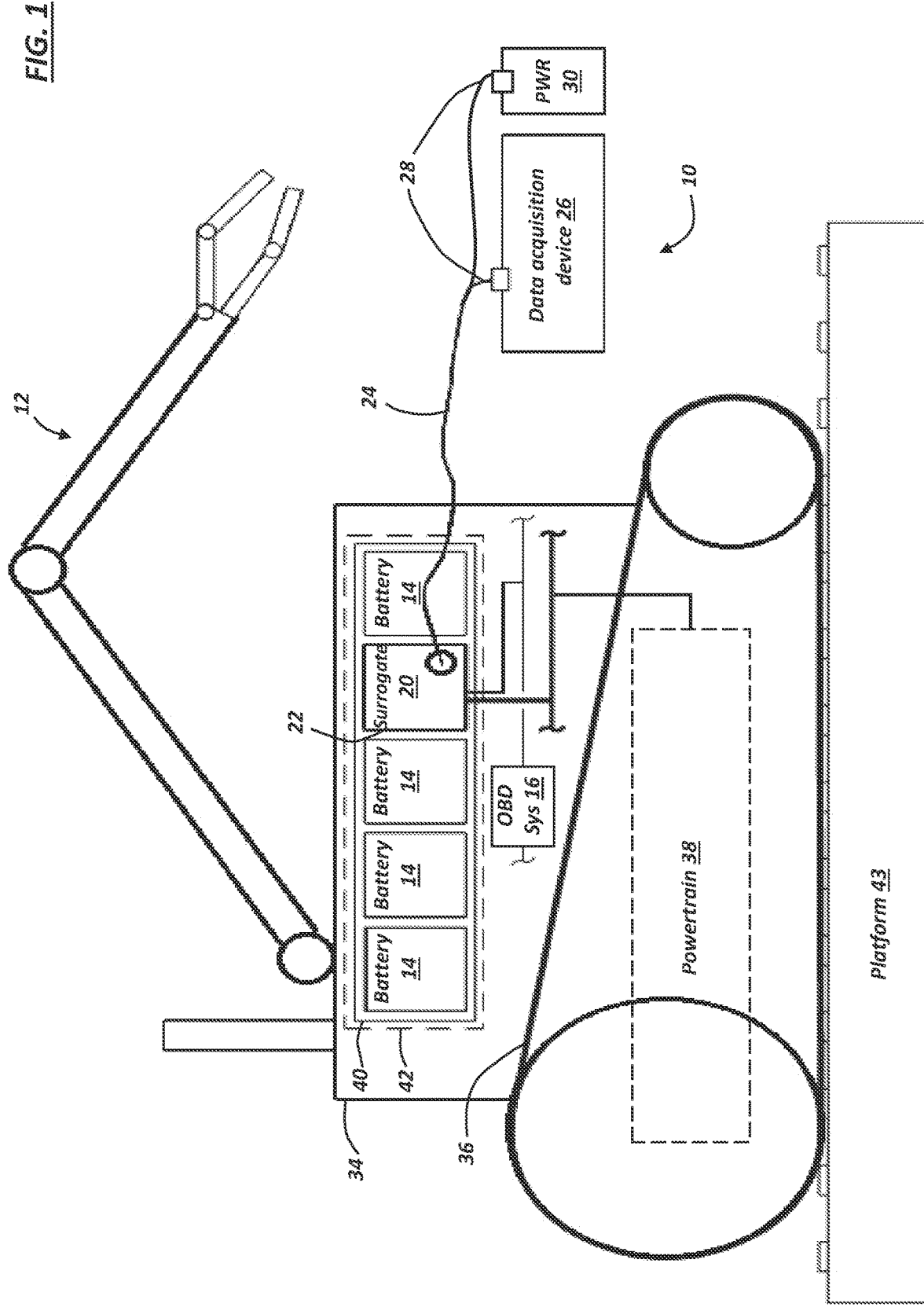
FIG. 1 is a schematic diagram illustrating an example of a test system for an electronic device (e.g., a robot), wherein the test system comprises a surrogate component, a data acquisition device, and a power supply.

Turning now to FIGS. 1 and 3, wherein throughout the figures like reference numerals indicate like or similar features or functions, a test system 10 is disclosed for an electronic device 12. Electronic device 12 may comprise one or more swappable (and/or rechargeable) batteries 14 and an onboard diagnostic (OBD) system 16 to monitor battery health. During engineering test and development of electronic device 12 (and/or subsystems thereof or therefor), test system 10 may be coupled to electronic device 12 in order to acquire diagnostic power data therefrom. As described more below, diagnostic power data may refer to battery power data, including but not limited to battery voltage, battery current draw, battery state of charge, electronic device total current draw (e.g., from all batteries 14), total remaining state of charge for all batteries, and the like. Test system 10 may comprise at least one surrogate component 20 (that comprises a body 22 that is couplable mechanically and electrically to electronic device 12 and a wiring harness 24 extending from the body 22), a data acquisition device 26 coupled to a distal end 28 of the harness 24, and a power supply 30 also coupled to distal end 28 of harness 24 (as shown in FIG. 1, distal end 28 may be bifurcated; however, this is not required in all examples). Surrogate component 20 may have a size and shape that corresponds with a size and shape of any of batteries 14 and consequently can be used as a substitute for one of the batteries 14 during testing of the electronic device 12. As will be described more below, surrogate component 20 may be detachably coupled to the electronic device 12 and may facilitate testing thereof, in part, by maintaining continuous electrical contact(s) with electronic device 12—regardless of whether electronic device 12 is undergoing test in a stationary mode or a nonstationary mode.

Electronic device 12 may be any suitable manned or unmanned electro-mechanical system. In the illustration, electronic device 12 is an unmanned ground vehicle (UGV) used in military applications—e.g., such as "The Talon" or a variant of "Common Robotic System" (CRS). Other non-limiting examples include other unmanned military or commercial vehicles, manned military or commercial vehicles, mobile or stationary electronics, or the like. Thus, the term 'electronic device' should be construed broadly to include any include any electro-mechanical device utilizing—at least in part—battery power. In at least one embodiment, electronic device 12 is a robot, wherein the term robot may refer to an at least partially-electrically-powered machine configured to replicate one or more human movements or functions. Further, in some examples, the robot also may be a vehicle or have vehicle characteristics. In the description which follows, electronic device 12 is embodied as a robot; however, it is to be appreciated that this is merely an example used for sake of clarity in this detailed description, and other non-robotic electronic device examples are contemplated herein.

Referring to FIG. 1, robot 12 may comprise a frame 34, a pair of continuous tracks 36 to facilitate mobility, an electrical powertrain 38 carried by frame 34 and drivably-coupled to continuous tracks 36, a battery compartment 40 on or within frame 34, multiple swappable and rechargeable batteries 14—located within compartment 40—and coupled to powertrain 38 (and/or other electronic systems (not shown)), a battery compartment cover 42 to enclose batteries 14 within compartment 40, and OBD system 16 electrically coupled to at least batteries 14. Frame 34, tracks 36, and powertrain 38 may be configured according to arrangements known in the art.

FIG. 1 illustrates that robot 12 may undergo testing on a platform 43 that simulates robot 12 operating in a nonstationary mode. As explained more below, test system 12 may be used on platform 43 or any other suitable stationary or nonstationary scenarios.

In at least one example, compartment 40 of robot 12 may be accessible via an outer region of robot 12—e.g., by removal of the cover 42. Compartment 40 may be configured to minimize the size of an overall spatial footprint of robot 12. E.g., according to the non-limiting illustrated embodiment, compartment 40 can carry five batteries, wherein each battery 14 may be positioned serially in a side-by-side, adjacent arrangement. Here however, four batteries 14 are shown, as the surrogate component 20 is shown substituted for one battery. In other examples, compartments holding different quantities of batteries 14 are also possible, as are different battery arrangements.

Turning to FIG. 2, one interior face 44 of compartment 40 may comprise a series of electrical footprints 46, wherein each footprint 46 corresponds to terminals on each of batteries 14. For example, each electrical footprint 46 may comprise a power connection 48 and a data connection 50. According to one example, each power connection 48 of compartment 40 may comprise a male connector 52 (having multiple pin terminals), and each data connection 50 of compartment 40 may comprise a plurality of data-communication contact pads 54 (also called data-delivering contact terminals); each of contact pads 54 may be coupled to a different spring (not shown) in order to bias the respective contact pad 54 toward the terminals of the battery 14 when the battery is positioned within the compartment 40. These are merely examples of the connections; power and/or data connections 48, 50 may be embodied differently in other examples. As used herein, a pin terminal may refer to an electrically-conductive rod configured to be inserted into a socket terminal (e.g., of a corresponding female connector). As used herein, a contact pad may refer to an electrically-conductive pad with a flat surface that is configured to establish an electrical connection by contact in an abutting relationship with another electrical contact (e.g., a contact pad of another device). In the instant example, the plurality of data-communication contact pads 54 (comprising data connection 50) may correspond with a mirrored-arrangement of data-delivering contact pads on an exterior surface of batteries 14 (not shown). Similarly, the male connector 52 (comprising power connection 48) may correspond with a corresponding female connector on an exterior surface of batteries 14 (also not shown). Thus, in accordance with the embodiment shown in FIG. 2, the power and data connections 48, 50 may be on a common exterior surface of battery 14 so that battery 14 is inserted into compartment 40 with this common side abutting one of the electrical footprints 46 of interior face 44, and data and power connections 48, 50 are established concurrently. It will be appreciated that other examples exist (e.g., having power and data connections 48, 50 on different exterior surfaces); thus, having power and data connections 48, 50 on a common side is not required in all examples.

Compartment 40 further may comprise a rail or lip (not shown) that is parallel to and spaced from interior face 44. This rail or lip may correspond with a feature on an exterior surface of battery 14 so that when male connector 52 (of one of the footprints 46) and the plurality of data-communication contact pads 54 (of respective footprint 46) are aligned with the female connector (of battery 14) and the corresponding data-delivering contact pads (of battery 14), battery 14 is detachably fixed between interior face 44 (or other face of compartment 40) and the rail or lip—e.g., in a so-called detent position. As used herein, a detent position may refer to a mechanical engagement that resists rotation and/or translation of the battery 14 within compartment 40. According to one example, cover 42 may interfere with batteries 14 when any single battery 14 is not in its respective detent position; however, cover 42 may be coupled securely to frame 34 once the batteries 14 are adjacently positioned and each are in a respective detent position.

OBD system 16 may monitor at least battery health by monitoring and/or evaluating diagnostic power data. More particularly, OBD system 16 may be coupled to the respective electrical footprints 46 in compartment 40 (i.e., to each battery's respective power and data connections 48, 50). In this manner, OBD system 16 may conduct onboard diagnostics of robot power, as well as individual battery health. According to an example, OBD system 16 monitors one or more parameters of each battery 14, including but not limited to: a battery voltage parameter, a cell voltage parameter for one or more cells within the respective battery 14, a battery current draw parameter, a battery state of charge (SoC) parameter, a remaining capacity parameter, an internal battery temperature, an external battery temperature, a battery full-charge capacity, a battery mode parameter (e.g., charging or discharging), a battery fault condition parameter, a battery runtime remaining parameter, a battery life cycle parameter, and one or more battery identifiers (e.g., such as a serial number, a hardware version number, a software version number, and/or one or more dates associated with the particular battery 14). As explained below, surrogate component 20 (and acquisition device 26) may gather similar information using an electrical connection to the electrical footprint 46, thereby leveraging the capability of the OBD system 16.

As described below, data acquisition device 26—via surrogate component 20—may acquire diagnostic power data using the OBD system 16 and based on its connectivity to batteries 14. Once such diagnostic power data is acquired, technicians, engineers, etc. may evaluate the data.

Turning now to FIGS. 3-7, a non-limiting embodiment of surrogate component 20 is shown which may comprise body 22 and wiring harness 24, as described above. Body 22 may comprise a first shell 60 and a second shell 62 which may be coupled to another via any suitable fastener, hinge, snap, clasp, clip, or the like (e.g., see fasteners 64). According to an orientation shown in FIG. 3 (and for purposes of explanation and clarity and not intending to be limiting), second shell 62 may be referenced herein as an upper shell, and first shell 60 may be referenced herein as a lower shell (e.g., the second shell 62 being illustrated above the first shell 60). Accordingly, in the description which follows, terms indicating direction or orientation—such as upper, lower, above, below, inboard, outboard, left, right, clockwise, counterclockwise, etc.—are for explanatory purposes only and not intended to be limiting.

Figure 4:
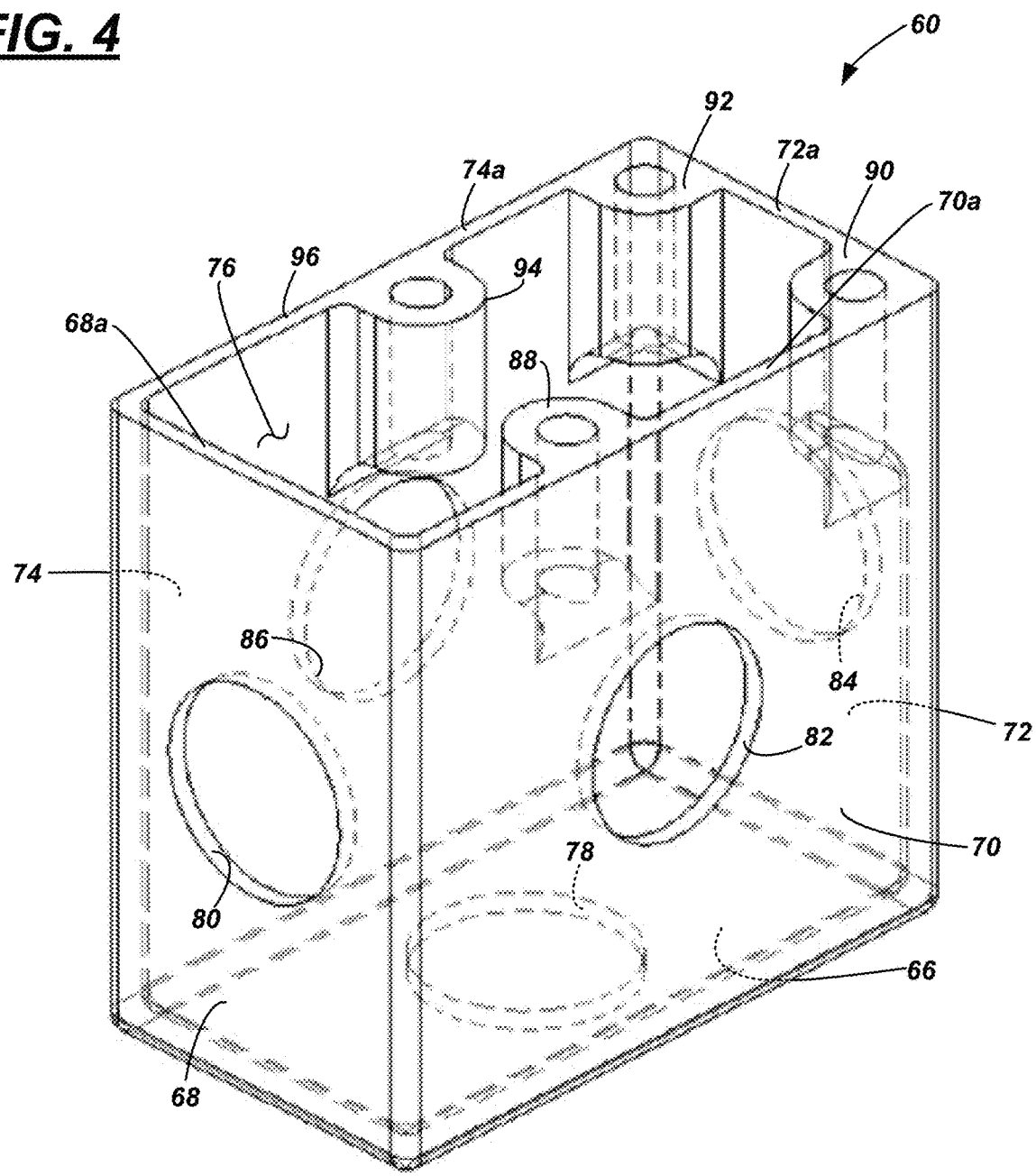
FIG. 4 is a perspective view of an embodiment of a first shell of the surrogate component.

As best shown in FIG. 4, first shell 60 may comprise an end wall 66 and a plurality of side walls 68, 70, 72, 74 coupled to and extending from the end wall 66, wherein the walls 66-74 define a cavity 76. In at least the illustrated example, first shell 60 may have a cuboid shape, wherein walls 70, 74 define major surfaces and walls 68, 72 define minor surfaces; however, this is not required in all examples.

Each of walls 66-74 may have a corresponding exit hole (e.g., exit holes 78, 80, 82, 84, 86, respectively) which may be centrally located within respective walls 66-74. In other examples, at least two or more of walls 66-74 have a corresponding exit hole (e.g., walls 66, 68 could have exit holes 78, 80, respectively, while walls 70-74 may not). Any suitable arrangements of exit holes on walls 66-74 are contemplated herein. Further, none of the exit holes 78-86 are required to be centrally-located; e.g., they could be located elsewhere on the respective wall.

In at least one embodiment, exit holes 78-86 (where present, in the respective embodiment) may have a grommet 87 inserted therein (e.g., see FIG. 3 for an example). As exit holes 78-86 may be similar in size and shape, the grommet 87 located in each exit hole 78-86 may be identical. Some embodiments do not comprise grommets 87. And in other embodiments, the size and/or shape of any exit holes 78-86 (and the corresponding grommet 87) may differ.

As shown in FIG. 4, four mounting features 88, 90, 92, 94 near an upper coupling edge 96 of first shell 60 may protrude into cavity 76 from one or more of the inner faces of walls 70, 72, 74, wherein upper coupling edge 96 may be defined by distal ends 68a, 70a, 72a, 74a of respective side walls 68, 70, 72, 74. Each feature 88-94 may comprise a blind hole and may be configured to receive respective fasteners 64 (e.g., may have threads that correspond to that of fasteners 64). In the non-limiting example shown in the illustrations, feature 88 extends radially inwardly from an inner surface of wall 70, feature 90 is positioned in a corner defined by inner surfaces of walls 70, 72 and extends radially inwardly therefrom, feature 92 is positioned in a corner defined by inner surfaces of walls 72, 74 and extends radially inwardly therefrom, and feature 94 extends radially inwardly from an inner surface of wall 74. More or fewer mounting features may be used in other examples; further, any suitable mounting features to couple the first and second shells 60, 62 may be used instead.

Figure 5:
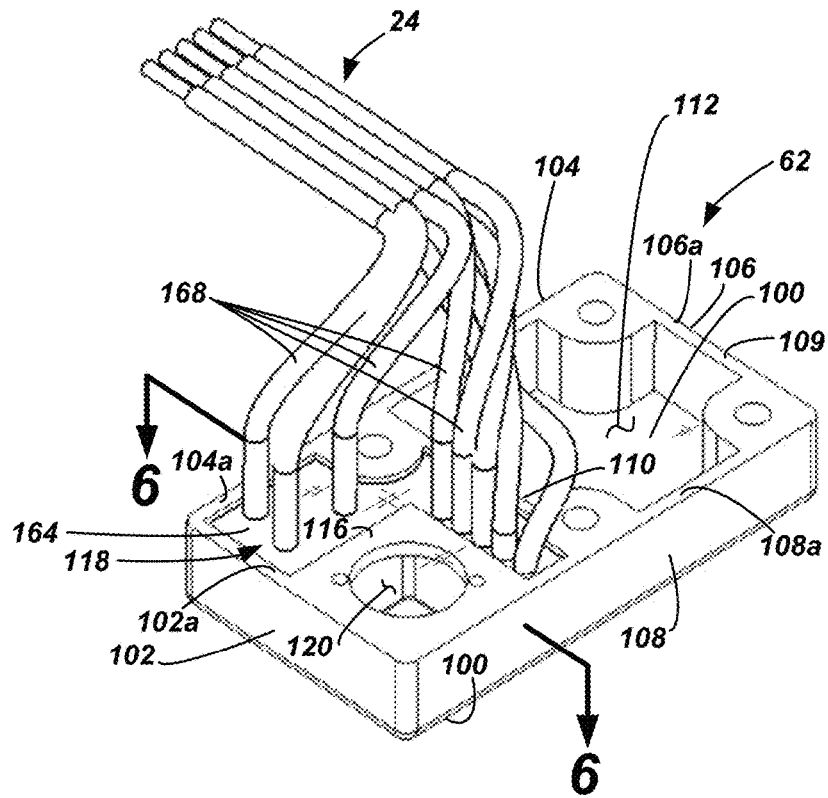
FIG. 5 is a perspective view of an embodiment of a second shell of the surrogate component, wherein a region of a cavity defined by walls of the second shell contains potting.
Figure 6:
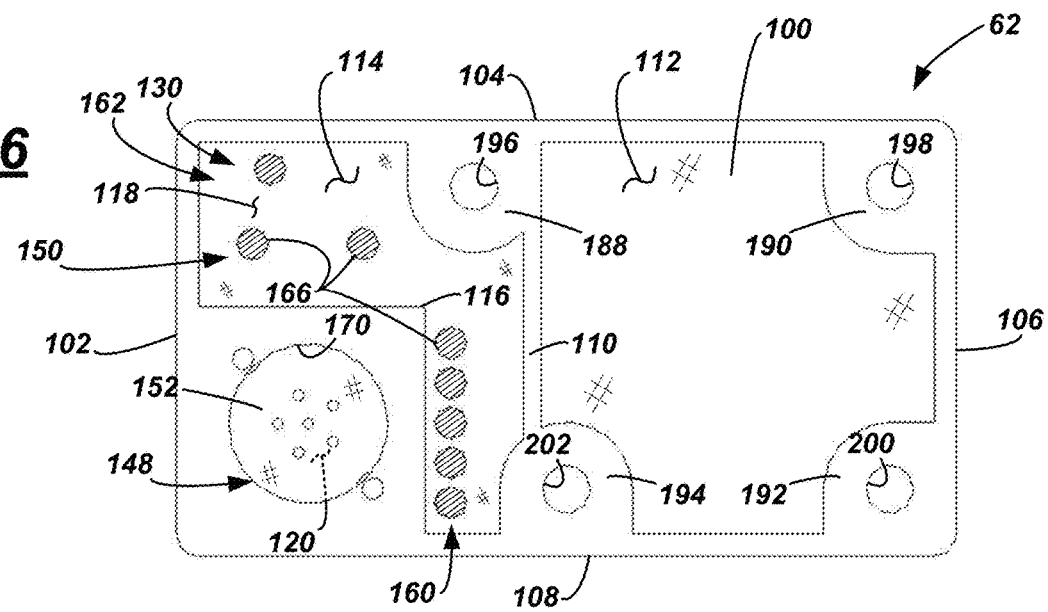
FIG. 6 is a sectional view of the second shell shown along section lines 6-6 of FIG. 5.

Turning now to second shell 62 (as best shown in FIGS. 3, 5, and 6), second shell 62 may comprise an end wall 100 and a plurality of side walls 102, 104, 106, 108 coupled to and extending from the end wall 100 (e.g., also having a cuboid shape). Respective distal ends 102a, 104a, 106a, 108a of walls 102-108 may define a lower coupling edge 109 (that may have a shape and size that corresponds to upper coupling edge 96 of first shell 60). An intermediate wall 110 may extend between walls 104, 108 such that a first cavity 112 is defined by walls 100, 104, 106, 108, 110 and such that a second cavity 114 is defined by walls 100, 102, 104, 108, 110. Further, second cavity 114 may be subdivided by a wall 116 (e.g., an L-shaped wall may extend between inner surfaces of walls 102 and 108)—resulting in a first region 118 and a second region 120. In at least one embodiment, wall 116 may partition a power connection 148 (e.g., also called a second connection interface) from a data connection 150 (e.g., also called a first connection interface) (best shown in FIG. 6)—which, when the surrogate component 20 is substituted for one of the batteries 14, power and data connections 148, 150 may correspond with the power and data connection 48, 50, respectively. According to an embodiment, power connection 148 may comprise a female connector 152 (having multiple socket terminals), and data connection 150 may comprise a plurality of data-receiving contact pads 154 (also called data-delivery contact terminals), wherein the size, type, and arrangement of power and data connections 148, 150 (on end wall 100) correspond with the size, type, and arrangement of power and data connections 48, 50 (of compartment 40 on robot 12).

As collectively shown in FIGS. 3, 5, and 6, in first region 118, end wall 100 may comprise a plurality of through-holes 156 (see FIG. 3) so the plurality of data-receiving contact pads 154 may be inserted therethrough (e.g., thereby enabling electrical contact at an outer surface 158 of end wall 100). FIG. 3 also illustrates that a portion 160 of these contact pads 154 may be linearly-arranged, whereas another portion 162 of contact pads 154 may be arranged non-linearly.

As collectively shown in FIGS. 5-6, first portion 118 of cavity 114 may be at least partially filled with potting 164 (e.g., an epoxy or resin) surrounding respective ends 166 of insulated data wires 168 coupled (e.g., soldered) to data-receiving contact pads 154. In this manner, the ends 166 of wires 168 (which typically have insulation removed) may be isolated from one another and from an environment of cavity 76 of first shell 60 (e.g., when the first and second shells 60, 62 are coupled to one another).

Within second portion 120 of cavity 114, power connection 148 (e.g., female connector 152) may be located in an opening 170 of wall 100. FIG. 5 illustrates second portion 120 without the power connection 148, and FIG. 6 illustrates the illustrative female connector 152 (in section), wherein female connector 152 extends through end wall 100 (as shown in FIG. 3). Power wires may couple to female connector 152 (these are hidden from view in FIG. 6).

FIGS. 5-6 also illustrate that second shell 62 may comprise mounting appurtenances 188, 190, 192, 194 which extend inwardly into the cavity 112 and/or cavity 114, wherein each of the appurtenances may comprise a through-hole (196, 198, 200, 202, respectively). E.g., more particularly, appurtenance 188 may extend inwardly from an inner face of wall 104 and from an inner face of intermediate wall 110 (e.g., into cavity 114), appurtenance 190 may extend inwardly from an inner face of walls 104, 106 (e.g., from a corner of cavity 112), appurtenance 192 may extend inwardly from an inner face of walls 106, 108 (e.g., from a corner of cavity 112), and appurtenance 194 may extend inwardly from an inner face of wall 108 (e.g., at least partially into cavities 112, 114—e.g., and may abut wall 110). This arrangement is merely exemplary; other examples exist. When first and second shells 60, 62 are assembled, through-holes 196-202 may align with threaded holes of features 88-94, respectively, so that fasteners 64 may detachably couple first shell 60 to second shell 62.

As shown in FIG. 3, first shell 60 and second shell 62 may be coupled to one another abutting upper and lower coupling edges 96, 109, and fasteners 64 may retain the first and second shells 60, 62 to one another. Wiring harness 24 may be routed from second shell 62, through any one of the exit holes 78-86 of first shell 60, and toward acquisition device 26. In at least some embodiments, grommet 87 may be fitted within the respective exit hole so that the harness 24 wears less due to friction (caused by the rubbing of an exterior surface of harness 24 with an inner edge of the respective exit hole). Thereafter, the surrogate component 20 may be inserted into compartment 40 (e.g., in a detent position, similar to batteries 14, so that power and data connections 148, 150 couple electrically with power and data connection 48, 50 of battery compartment 40). It should be appreciated that depending on the arrangement of batteries 14, depending on the size and location of compartment 40 (e.g., on robot 12), depending on the location and quantity of test harnesses connected to robot 12, or depending on a combination thereof, one or more of the exit holes 78-86 may be more suitable for harness-routing. Thus, the user (e.g., typically a test engineer) may route the harness 24 through the exit hole most suitable to the present configuration/ arrangement (e.g., and then secure the first and second shells 60, 62 to one another and locate the surrogate component 20 in the detent position).

Wiring harness 24 may comprise one or more data communication lines and one or more power lines. Non-limiting examples of data communication lines include and power lines are shown in FIG. 7 and described below.

Returning to FIG. 1, data acquisition device 26 may be any apparatus that may be coupled to the distal end 28 of wiring harness 24 and that may be used to collect diagnostic power data. E.g., in some examples, device 26 is configured to receive and record analog and digital signals (from robot 12); and in at least one example, device 26 is configured to receive and record data associated with batteries 14. In some instances, device 26 comprises and/or is electrically connected to a computer (not shown). Data acquisition device 26 may comprise one or more ports, connectors, and/or the like—e.g., including at least one feature for coupling with wiring harness 24. Other features of device 26, as well as techniques used to employ device 26, will be appreciated by those skilled in the art.

As also shown in FIG. 1, power supply 30 may comprise any electrical hardware device that supplies power and that may be coupled to wiring harness 24. In at least one embodiment, power supply 30 provides power to robot 12 via harness 24 and via surrogate component 20 by providing power at a voltage typical of one of batteries 14. E.g., if batteries 14 are BB-2590 batteries, a nominal voltage (V) may be approximately 10 V; however, in other battery examples, the nominal voltage may differ. Other characteristics of power supply 30 may mimic the batteries 14 onboard robot 12—e.g., such as minimum and maximum current draw, in-rush current, etc. Other features of power supply 30, as well as techniques used to employ power supply 30, will be appreciated by those skilled in the art. In at least some embodiments, power supply 30 may comprise one or more of batteries 14. In some examples, power supply 30 may be a separate device; in other implementations, it may be part of data acquisition device 26.

Figure 7:
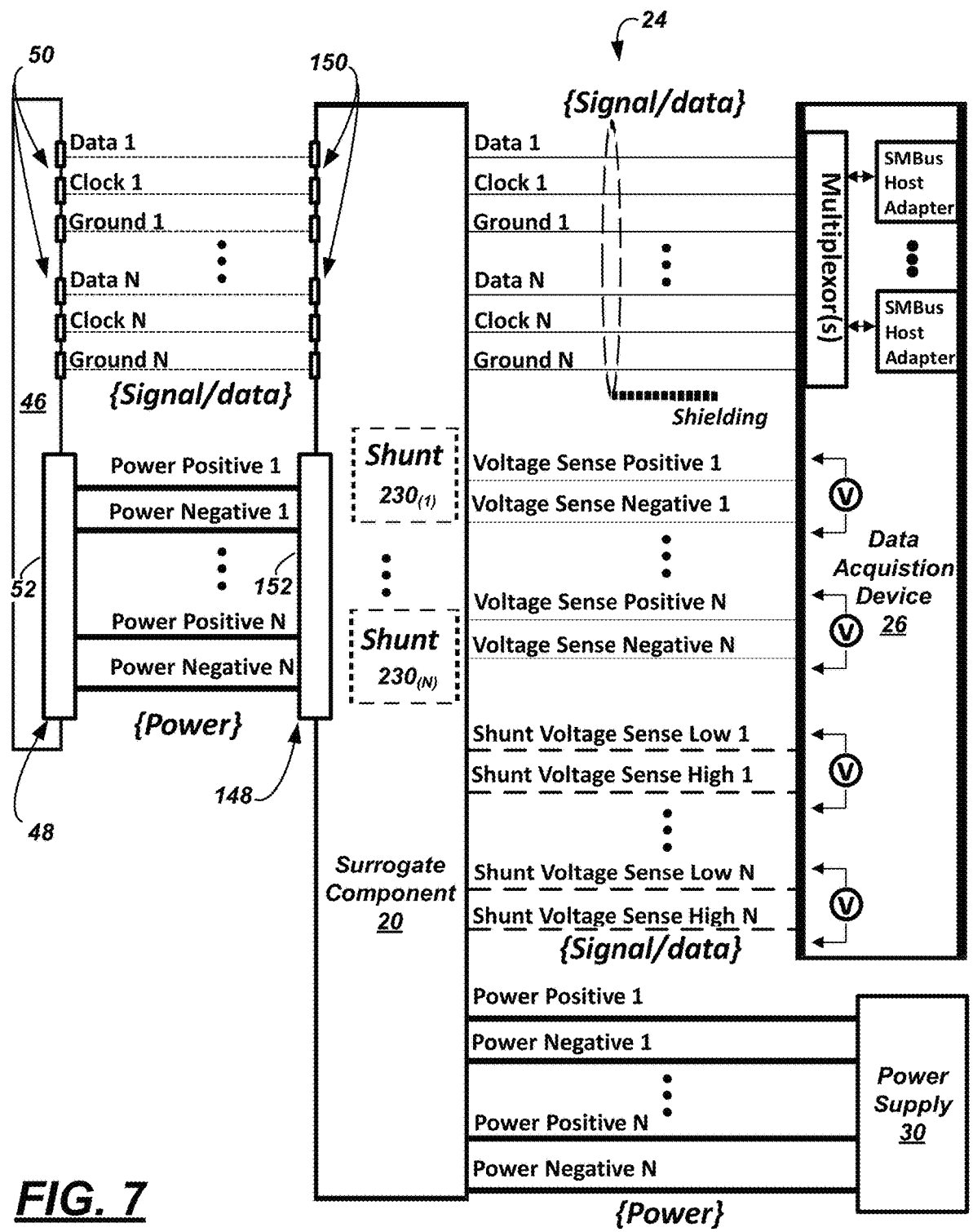
FIG. 7 is a schematic of an electrical connection diagram illustrating a connection relationship between the electronic device of FIG. 1, the surrogate component, and the data acquisition device and power supply.

FIG. 7 is an exemplary connection diagram illustrating an interface diagram between electrical footprint 46 (of compartment 40 of robot 12) and the surrogate component 20, as well as an embodiment of a wiring diagram between the surrogate component 20 and the data acquisition device 26 and the power supply 30. More particularly, FIG. 7 illustrates an electrical contact connection between data connection 50 (compartment 40) and data connection 150 (surrogate component 20) and an illustrative pin and socket diagram between connectors 52, 152. Further, FIG. 7 illustrates that wiring harness 24 may extend between surrogate component 20 and each of data acquisition device 26 and power supply 30.

Between electrical footprint 46 and surrogate component 20, data connections 50, 150 may comprise a set of data signals—e.g., a raw data signal, a raw clock signal, and raw ground. Further, multiple sets may exist (e.g., quantity "N"). Additionally, power connections 48, 148 may comprise one or more sets of power signals—e.g., a raw positive signal and a raw negative signal. Similarly, multiple ("N") sets of power signals may exist. And wiring harness 24 (between surrogate component 20 and data acquisition device 26) may pass through the one or more sets of raw data signal, raw clock signal, and raw ground (e.g., from robot 12 to data acquisition device 26). Similarly, wiring harness 24 (between surrogate component 20 and power supply 30) may pass through the one or more sets of raw positive and negative signals (e.g., from power supply 30 to robot 12).

In some embodiments, a shunt circuit (not shown) may be located in data acquisition device 26. In this manner, a shunt voltage sense Low and a shunt voltage sense High may be determined. Other embodiments exist.

Figure 8:
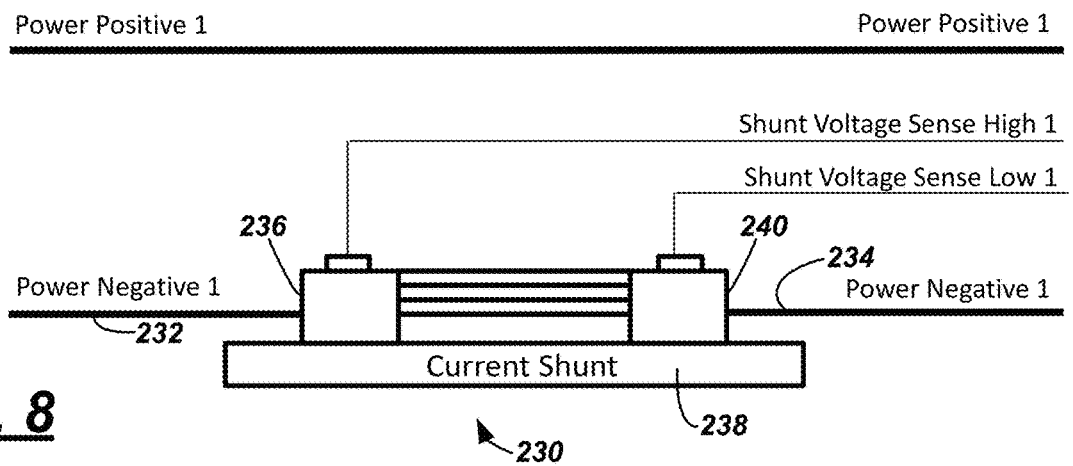
FIG. 8 is an example of a shunt circuit that may be used in some embodiments of the surrogate component.
Figure 9:
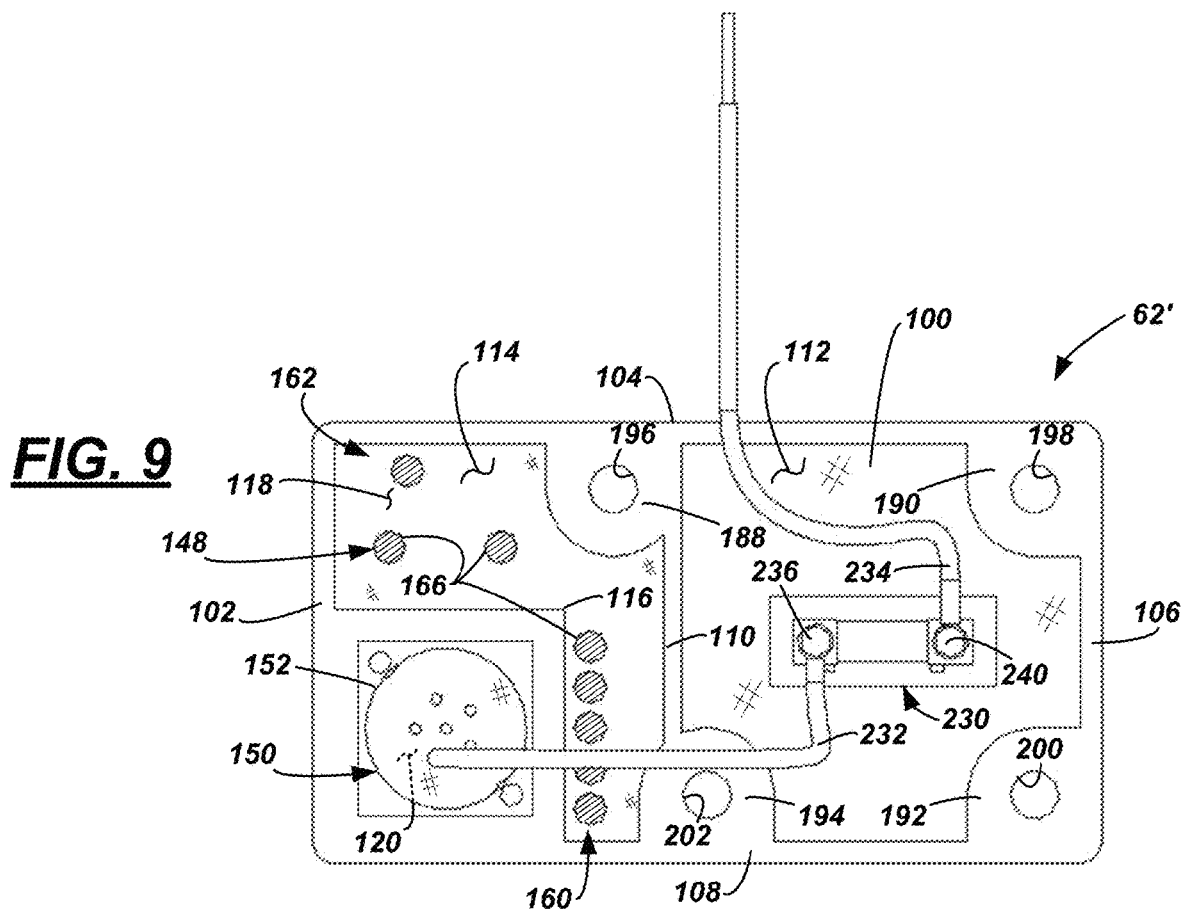
FIG. 9 is a sectional view similar to FIG. 6 illustrating an alternate embodiment of the second shell comprising the shunt circuit shown in FIG. 8.

For example, FIGS. 7-9 illustrate that an optional shunt circuit 230 may be employed within surrogate component 20—e.g., in series with any raw negative signal (e.g., such as "Power Negative 1"). More particularly, shunt circuit 230 may comprise a relatively large resistor coupled between a first portion 232 of a power line (e.g., "Power Negative 1") and a second portion 234 of the power line (e.g., in series with "Power Negative 1"). E.g., a node 236 of a shunt resistor 238 may be coupled to first portion 232, and a node 240 of resistor 238 may be coupled to second portion 234. Selection of an appropriately-sized resistor will be appreciated by those skilled in the art. A set of differential voltage signals may be determined using the shunt circuit 230 (e.g., a shunt voltage sense High (coupled to a higher voltage side of the resistor) and a shunt voltage sense Low (coupled to a lower voltage side of the resistor)). FIG. 9 illustrates an example of shunt circuit 230 being located in cavity 112 of a second shell 62' (e.g., mounted on end wall 100); this is merely an example, and other embodiments are possible. As shown in FIG. 7, surrogate component 20 may have "N" quantity of such shunt circuits 230 (e.g., labeled shunt circuit $230_{(1)}, \ldots,$ shunt circuit $230_{(N)}$). Accordingly, one or more sets of differential voltage signals may be passed from surrogate component 20 to data acquisition device 26.

Thus, there has been described a test system for an electronic device which uses one or more batteries. A surrogate component is described which has a size and shape that conforms to batteries typically used to power the electronic device. The surrogate component may be a two-piece device that offers versatility in cable routing—e.g., facilitating the routing of a wiring harness from a selectable side of the surrogate component. Further, as the surrogate component may mimic the size and features of a battery, it may more easily be retained within a battery compartment (maintaining electrical connections)—e.g., even when the electronic device undergoes testing that might otherwise shake conventional test wires loose. Using the surrogate component, a test engineer may be able to provide power to the electronic device (mimicking a battery) while concurrently receiving serial data associated with a power system of the electronic device.

Embodiments of the present disclosure have been described above. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

What is claimed is:

1. A surrogate component, comprising:
   a body, comprising,
      a first shell comprising
         a first end wall;
         a first plurality of side walls coupled to the first end wall, wherein the first end wall and the first plurality of side walls define a cavity;
         a first coupling edge defined by a distal end of each of the first plurality of side walls; and
         a plurality of exit holes; and
      a second shell coupled to the first shell, wherein the second shell comprises
         a first connection interface;
         a second connection interface;
         a second end wall, comprising at least two openings, wherein the first connection interface is located at one of the at least two openings, and wherein the second connection interface is located at another of the at least two openings;
         a second plurality of side walls coupled to the second end wall; and
         a second coupling edge defined by a distal end of each of the second plurality of side walls, wherein the second coupling edge corresponds with the first coupling edge; and
   a wiring harness, comprising:
      at least one data communication line coupled to the first connection interface and passing through one of the plurality of exit holes; and
      at least one power line coupled to the second connection interface and passing through the one of the plurality of exit holes, wherein
   an intermediate wall extends between at least two of the second plurality of side walls and defines a first cavity and a second cavity, wherein the first and second connection interfaces are located in the second cavity, and wherein
   the first cavity comprises a shunt circuit, wherein the at least one power line comprises a first portion that couples to a first terminal of the shunt circuit, and a second portion that couples to a second terminal of the shunt circuit.

2. The surrogate component of claim 1, wherein the first end wall comprises at least one of the plurality of exit holes.

3. The surrogate component of claim 2, wherein each of the first plurality of side walls comprises at least one of the plurality of exit holes.

4. The surrogate component of claim 1, wherein at least one of the first plurality of side walls comprises at least one of the plurality of exit holes.

5. The surrogate component of claim 1, further comprising a grommet located at each of the plurality of exit holes.

6. The surrogate component of claim 1, wherein the second connection interface comprises a power connector.

7. The surrogate component of claim 6, wherein the power connector is a female connector.

8. The surrogate component of claim 6, wherein the power connector is compliant with MIL-STD-38999.

9. The surrogate component of claim 1, wherein the first connection interface comprises a plurality of data-receiving contact pads positioned to face outwardly with respect to the second end wall.

10. The surrogate component of claim 9, wherein at least a portion of the plurality of data-receiving contact pads are linearly-aligned on the second end wall.

11. The surrogate component of claim 1, wherein the second cavity comprises potting.

12. A test system, comprising:
   an electrically-powered machine comprising a battery compartment and a plurality of electrical footprints, wherein each of the plurality of electrical footprints comprise a power interface and a data interface;
   a surrogate component comprising
      a body including a first shell having a plurality of exit holes and a second shell coupled to the first shell, wherein the second shell includes a first connection interface and a second connection interface, and
      a wiring harness including
         at least one data communication line coupled to the first connection interface and passing through one of the plurality of exit holes, and
         at least one power line coupled to the second connection interface and passing through the one of the plurality of exit holes, wherein
      the surrogate component is located within the battery compartment, and wherein the first and second connection interfaces are coupled to one of the plurality of electrical footprints;
   one or more batteries located within the battery compartment, wherein each of the one or more batteries is coupled to a different one of the other plurality of electrical footprints, wherein the surrogate component has a size and shape common to each of the one or more batteries; and
   a data acquisition device coupled to a distal end of the wiring harness.

13. The test system of claim 12, further comprising a power supply that delivers power to the machine via the wiring harness while concurrently receiving diagnostic power data from the machine via the surrogate component.

* * * * *